United States Patent
Roth et al.

(10) Patent No.: US 8,069,363 B2
(45) Date of Patent: Nov. 29, 2011

(54) DOUBLE DATA RATE OUTPUT LATCH FOR STATIC RAM DEVICE HAS EDGE-TRIGGERED FLIP-FLOP TO OUTPUT DDR SIGNAL TO SYNCHRONIZE WITH A SECOND CLOCK SIGNAL

(75) Inventors: Alan Roth, Austin, TX (US); Oswald Becca, Roundrock, TX (US); Pedro Ovalle, Austin, TX (US)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 126 days.

(21) Appl. No.: 12/543,839

(22) Filed: Aug. 19, 2009

(65) Prior Publication Data

US 2010/0033216 A1 Feb. 11, 2010

Related U.S. Application Data

(63) Continuation of application No. 11/305,433, filed on Dec. 14, 2005, now Pat. No. 7,596,710, which is a continuation of application No. 10/352,372, filed on Jan. 27, 2003, now Pat. No. 7,010,713.

(60) Provisional application No. 60/434,841, filed on Dec. 19, 2002.

(51) Int. Cl.
*G06F 1/12* (2006.01)
*H03L 7/00* (2006.01)

(52) U.S. Cl. ............... 713/400; 327/153; 365/233.13

(58) Field of Classification Search ............... 713/400; 327/153; 365/233.13
See application file for complete search history.

(56) References Cited

U.S. PATENT DOCUMENTS

| | | | |
|---|---|---|---|
| 4,949,360 | A | 8/1990 | Martin et al. |
| 5,132,990 | A | 7/1992 | Dukes et al. |
| 5,256,912 | A | 10/1993 | Rios |
| 5,259,006 | A | 11/1993 | Price et al. |
| 5,467,040 | A | 11/1995 | Nelson et al. |
| 5,754,833 | A | 5/1998 | Singh et al. |
| 5,764,591 | A | 6/1998 | Matsui et al. |
| 5,919,265 | A | 7/1999 | Nishtala et al. |
| 5,968,180 | A | 10/1999 | Baco |
| 6,097,775 | A | 8/2000 | Weber et al. |
| 6,111,925 | A | 8/2000 | Chi |

(Continued)

FOREIGN PATENT DOCUMENTS

EP 0 547 768 A2 6/1993

(Continued)

OTHER PUBLICATIONS 2001-576679, May 2001, Derwent, Nam, Ju.*

(Continued)

*Primary Examiner* — Chun Cao
(74) *Attorney, Agent, or Firm* — Hamilton, Brook, Smith & Reynolds, P.C.

(57) ABSTRACT

A synchronization circuit for re-synchronizing data from an input clock to an output clock is presented. The first transparent latch receives data synchronized to an input clock. A second transparent latch receives data from the first transparent latch and outputs data dependent on a delayed output clock which is the output clock delayed by an insertion delay. An output latch receives data from the second transparent latch and synchronizes data to the output clock.

6 Claims, 13 Drawing Sheets

U.S. PATENT DOCUMENTS

| | | | |
|---|---|---|---|
| 6,201,760 | B1 | 3/2001 | Yun et al. |
| 6,374,371 | B1 | 4/2002 | Lee |
| 6,381,194 | B2 | 4/2002 | Li |
| 6,381,684 | B1 | 4/2002 | Hronik et al. |
| 6,392,946 | B1 | 5/2002 | Wu et al. |
| 6,636,980 | B1 | 10/2003 | Gervais et al. |
| 6,792,554 | B2 | 9/2004 | Gervais et al. |
| 6,917,561 | B2 | 7/2005 | Moss et al. |
| 7,010,713 | B2 * | 3/2006 | Roth et al. .............. 713/400 |
| 7,038,971 | B2 | 5/2006 | Chung |
| 7,596,710 | B2 * | 9/2009 | Roth et al. .............. 713/400 |
| 2002/0060949 | A1 | 5/2002 | Kim |
| 2002/0199124 | A1 | 12/2002 | Adkisson |

FOREIGN PATENT DOCUMENTS

| | | |
|---|---|---|
| EP | 1 071 005 A2 | 1/2001 |
| JP | 05-289770 | 11/1993 |
| WO | WO 01/16958 A1 | 3/2001 |

OTHER PUBLICATIONS

"QDR™ II SRAM: A Design Guide," Cypress Semiconductor Corporation, Jun. 12, 2002.

"18Mb QDR™ II SRAM 2—Word Burst," Micron Technology, Inc., Aug. 2002.

"QDR™ SRAM Design Guide," Technical Note, Micron Technology, Inc., Oct. 2002.

"QDR™ II and DDRII SRAM Clocking Strategies," Technical Note, Micron Technology, Inc., Oct. 2001.

NPF LA-1 Interface Specification Compatible with QDR SRAM. QDR SRAM—The High Bandwidth SRAM Family, [online] Jul. 15, 2002 [retrieved on Feb. 21, 2003]. Retrieved from the Internet <URL: http:/www.qdrsram.com-news-7_15_2002.htm.

Harris, David and Horowitx, Mark, "Timing Analysis Including Clock Skew," IEEE Transactions on Computer-Aided Design of Interated Circuits and Systems 18(11):1608-1618 (1999).

Japanese Office Action received Jun. 3, 2011, Japanese Application No. 509996/2005 (English Translation).

* cited by examiner

DOUBLE DATA RATE OUTPUT LATCH FOR STATIC RAM DEVICE HAS EDGE-TRIGGERED FLIP-FLOP TO OUTPUT DDR SIGNAL TO SYNCHRONIZE WITH A SECOND CLOCK SIGNAL

RELATED APPLICATIONS

This application is a continuation of U.S. application Ser. No. 11/305,433, filed Dec. 14, 2005 now U.S. Pat. No. 7,596,710, which is a continuation of U.S. application Ser. No. 10/352,372 filed Jan. 27, 2003 (now U.S. Pat. No. 7,010,713), which claims the benefit of U.S. Provisional Application No. 60/434,841, filed on Dec. 19, 2002. The entire teachings of the above applications are incorporated herein by reference.

BACKGROUND OF THE INVENTION

Double Data Rate (DDR and DDRII) and Quad Data Rate (QDR and QDRII) are industry standard architectures for high-speed networking Static Random Access Memory (SRAM). The DDR architecture doubles the data rate of standard SRAM by performing two memory accesses per clock cycle. In the QDR architecture, the input port and the output port are separate and operate independently allowing two memory reads and two memory writes per clock cycle. With two memory reads and writes per clock cycle, the QDR architecture quadruples the data rate of standard SRAM by allowing four memory accesses per clock cycle.

The QDR architecture was originally designed for high speed SRAM interfaces. However, the QDR architecture has been adopted for other high frequency applications, for example, as a standard interface to memory based co-processors.

The QDR architecture defines a master clock pair that is used to control read and write accesses to the SRAM. For example, all data read from SRAM is aligned to the rising edges of the master clock pair.

When operating at a low operating frequency, for example, below 133 MHz, there is sufficient time for a bus master such as, an ASIC or a microprocessor coupled to the QDR device to use the rising edges of the master clock pair to capture the data synchronized to the master clock pair. However, as the operating frequency of the QDR device is increased, data valid windows and hold times decrease accordingly. Data synchronized to the master clock pair by the memory based co-processor may not be valid when captured by the bus master using the master clock pair. In order to allow the bus master to capture valid data when operating at higher frequencies, the QDR architecture also defines a data clock pair. The data clock pair is a phase-shifted version of the master clock pair.

The QDR architecture permits the bus master to use the data clock pair to capture the data instead of the master clock pair in order to meet data setup and hold times at the bus master. Thus, the memory-based co-processor must synchronize the data to the data clock pair after it has been read from data storage. There can be a significant phase difference (skew) between the master clock pair and the data clock pair.

SUMMARY OF THE INVENTION

A skew compensation circuit, which complies with the QDR II interface requirements and deals with significant phase difference between an input clock and an output clock, is presented.

A transparent latch has two states, open and closed. While open, the transparent latch passes data on the input to the output. While closed, the transparent latch holds the data present on the input on the transition from the open to the closed state. While open the transparent latch provides a window for capturing the data present on the input to avoid waiting for a next clock edge to pass data from the input to the output.

A synchronization circuit for re-synchronizing data from an input clock to an output clock includes a first transparent latch, a second transparent latch and an output latch. The first transparent latch receives the data and is clocked by the input clock. The second transparent latch receives data from the first transparent latch and is clocked by a delayed output clock. The delayed output clock is a delayed version of the output clock. The output latch receives data from the second transparent latch and is clocked by the output clock. The delayed output clock may include an insertion delay. The output clock may be a delay locked loop version of the delayed output clock with the insertion delay removed.

The input clock may be a K# clock of a master clock pair and the output clock a C# clock of a data clock pair. The output latch may be edge triggered. Data may be output from the output latch at a double data rate.

The first transparent latch and the second transparent latch pass received data when open and hold a last data received when closed. In one embodiment, the first transparent latch is open when the input clock is logic '1' and closed when the input clock is logic '0' and the second transparent latch is open when the delayed output clock is logic '1' and closed when the output clock is logic '0'.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
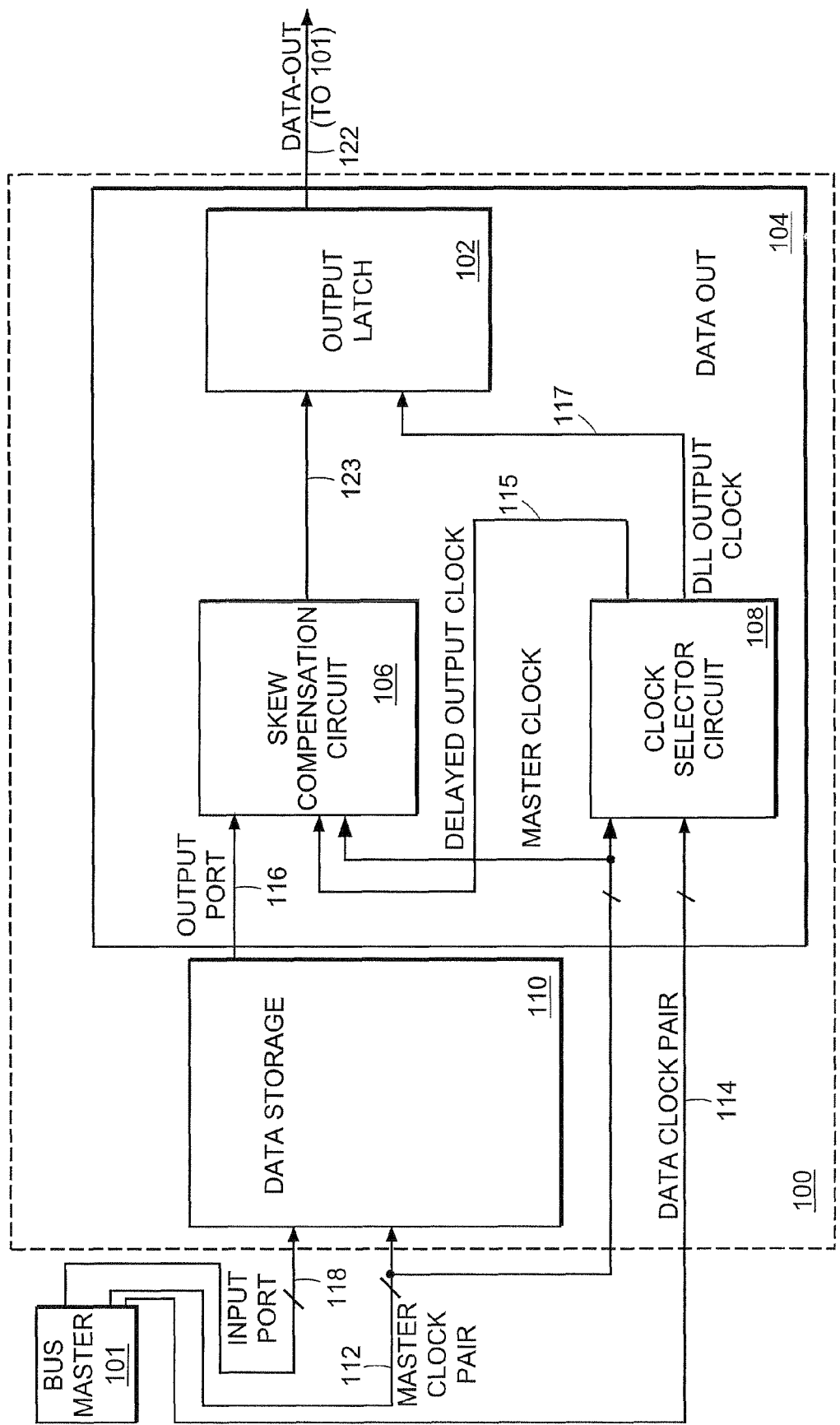
FIG. 1 is a block diagram of a device including a skew compensation circuit for synchronizing data received from data storage according to the principles of the present invention.

FIG. 1 is a block diagram of a device 100 including a skew compensation circuit 106 for synchronizing data received from data storage 110 according to the principles of the present invention. The device 100 provides data stored in the data storage 110 in response to a request to read the data received from a bus master 101. The bus master 101 can be a microprocessor or an Application Specific Integrated Circuit (ASIC) capable of issuing a command to the device 100.

The data output from data storage 110 is synchronized to the master clock pair. The data out circuit 104 resynchronizes the data received from data storage to an output clock 115 selected by the clock selector circuit 108. Data from data storage synchronized to the master clock pair 106 is conditioned by the skew compensation circuit 106 so that data transmitted to the output latch 102 can be synchronized to the output clock.

Figure 2A:
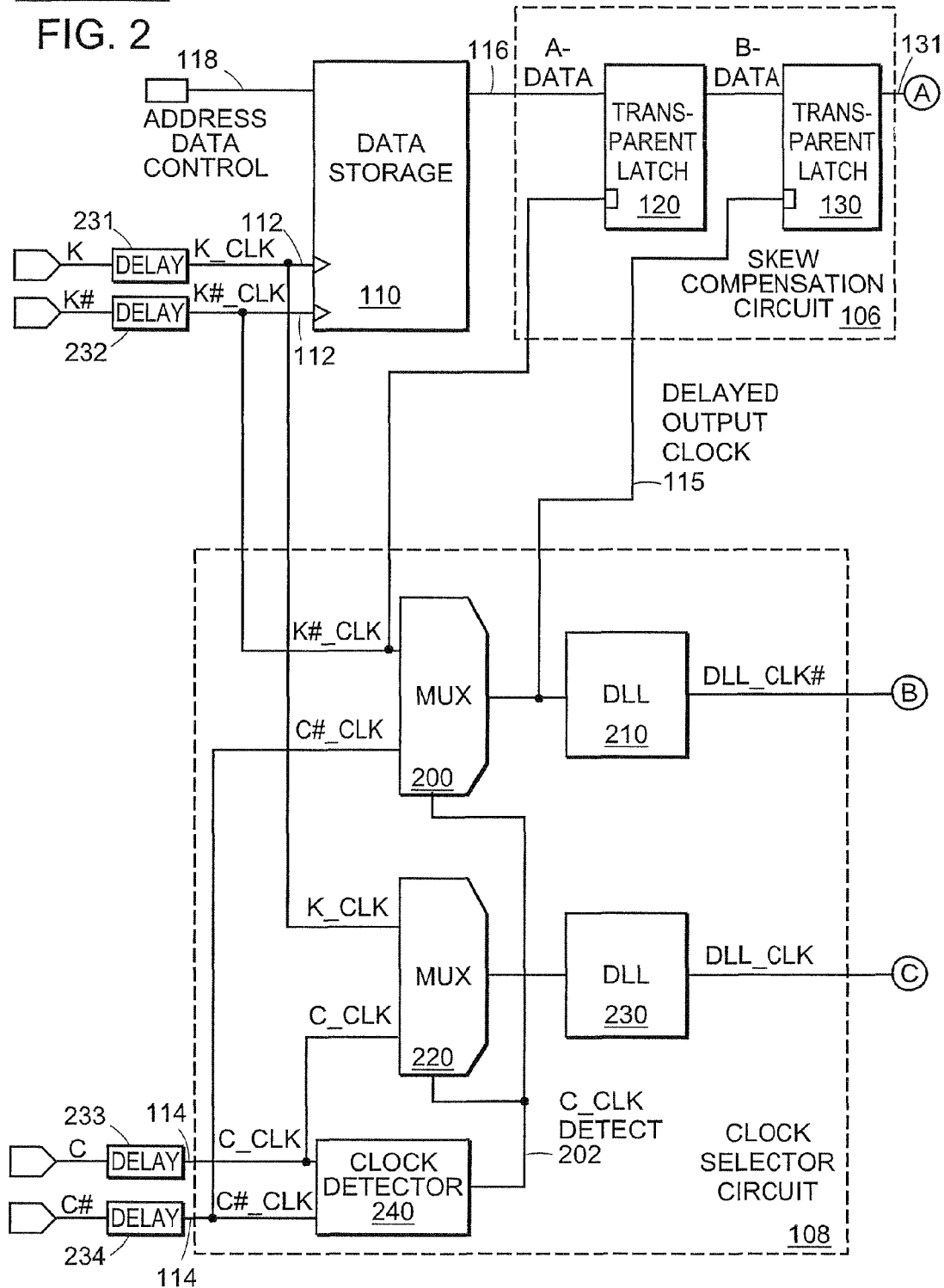
FIG. 2 is a more detailed block diagram of the data out interface coupled to the data storage shown in FIG. 1.
Figure 2B:
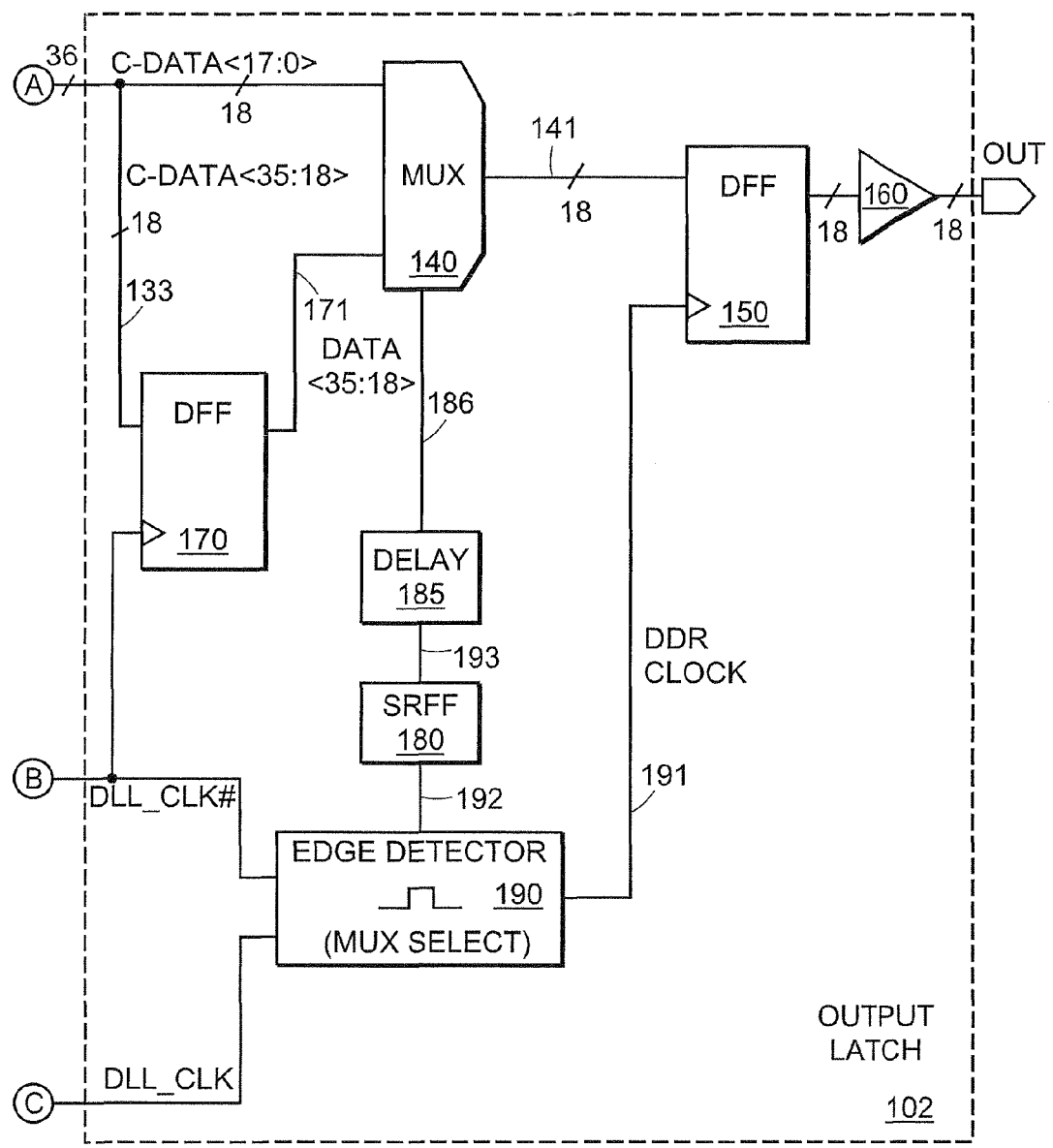

The skew compensation circuit 106 compensates for the skew between the master clock pair and the selected output clock and skew between the data and the master clock pair. Referring to FIG. 2, the skew compensation circuit 106 includes two transparent latches 120, 130. Each transparent latch 120, 130 has two states; open and closed. When the latch is in the open state, data present on the input passes to the output. When the latch is in the closed state, data present on the input on the transition from open to closed state is held on the output of the latch.

In the embodiment shown, the latches 120, 130 are open when the respective clock signal coupled to the clock input is '1' and closed when the respective clock signal is '0'. When open, the transparent latch provides a window for capturing data on the input instead of waiting for a next clock edge.

Returning to FIG. 1, the data storage 110 can include memory or registers for storing data and has a separate input port 118 and output port 116 that operate independently, allowing data to be simultaneously read and written. Data output received by the data out circuit 104 on output port 116 is synchronized to a master clock pair 112.

The data out circuit 104 synchronizes data received from data storage 110 to an output clock. A clock selector circuit 108 selects the output clock for synchronizing the data output 122.

In one embodiment, the data output through the output port 116 is synchronized to the rising edges of the master clock pair 112. However, in alternate embodiments, the data output can be synchronized to the falling edges of the master clock pair 112. After the data synchronized to the master clock pair is output from the data storage 110, the data can be synchronized to an output clock 115. The data clock pair 114 is a phase-shifted version of the master clock pair 112. The skew compensation circuit 106 handles a phase shift (skew) of up to 180 degrees between the master clock pair 112 and the data clock pair 114.

The clock selector circuit 108 includes a clock detector for detecting a clock signal on the data clock pair 114. The clock detector is described later in conjunction with FIG. 5. If a clock signal is detected on the data clock pair 114, one of the clock signals of the data clock pair 114 is selected as the delayed output clock 115 for the skew compensation circuit 106 to condition the data so that it can be synchronized to the output clock by the output latch 102. Otherwise, one of the master clock pair 112 is selected as the delayed output clock 115 for the skew compensation circuit 106.

After the data has been conditioned based on the delayed output clock 115, the conditioned data 123 output by the skew compensation circuit 106 is coupled to an output latch 102. The output latch 102, synchronizes the conditioned data to the output clock (DLL output clock) 117 to provide data out synchronized to the output clock 117.

FIG. 2 is a more detailed block diagram of the data out interface 104 coupled to the data storage 110 shown in FIG. 1. In the embodiment shown, the output latch 102 includes circuitry for generating a Dual Data Rate (DDR) data out. However, in an alternate embodiment, a single data rate output can be provided by coupling the input of D-type flip flop 150 directly to the output of transparent latch 130 in the skew compensation circuit 106 and clocking D-type flip flop 150 with the DLL_CK output from DLL 210.

Figure 3:
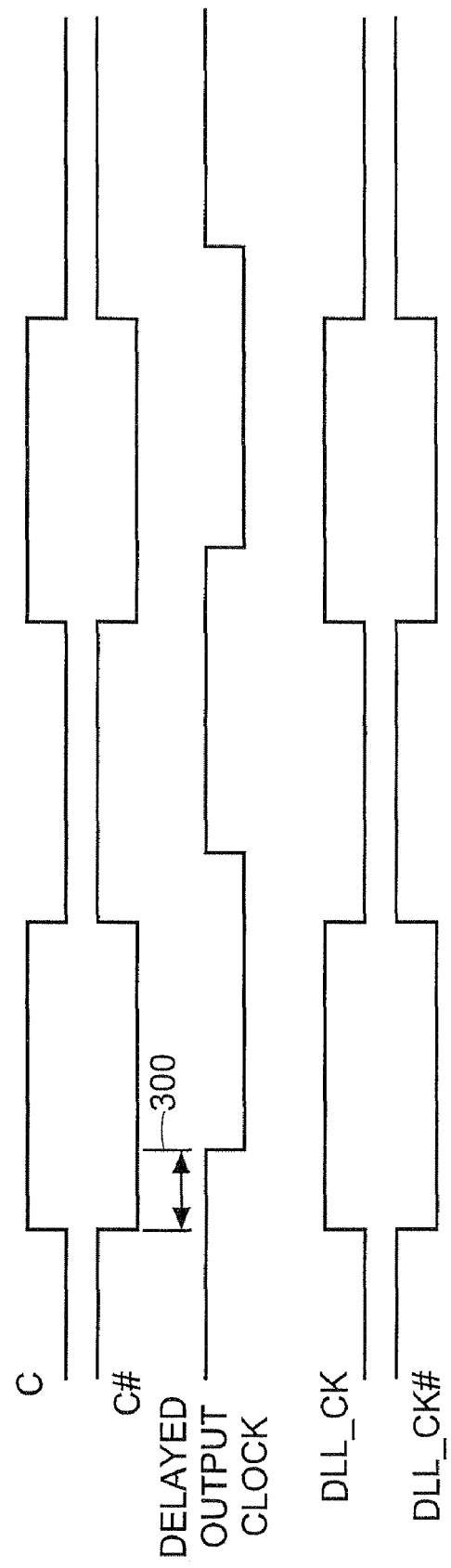
FIG. 3 is a timing diagram illustrating insertion delay.

As discussed previously, the data clock pair 114 is a phase-shifted version of the master clock pair 112. In the embodiment shown for the QDR architecture, the master clock pair 112 includes a K_CLK signal and a K#_CLK signal (FIG. 3). The K#_CLK signal is the K_CLK signal phase shifted by 180 degrees. The data clock pair 114 includes a C_CLK signal and a C#_CLK signal. The C_CLK signal is the C_CLK signal phase shifted by 180 degrees.

In the embodiment shown, the data storage 110 is a dual port Static Random Access Memory (SRAM) with separate independent input and output ports. Each of the input port 118 and the output port 116 includes a 36-bit data bus. The input port 118 also includes address and control signals. All data and commands that are input through the input port 118 and data that is output through the output port 116 are synchronized to the master clock pair (K_CLK, K_CLK) 112.

In an alternative embodiment, the data storage 110 can be content addressable memory (CAM) or dynamic random access memory (DRAM). The data storage can also be a logic block, for example, a block of registers for storing data.

The input port 118 accepts double data rate data, that is, a new command or data can be received twice every K_CLK period. For example, in one embodiment, a new command or data is received on each edge (falling and rising) of the K-CLK signal by capturing the command or data on both the rising edge of K_CLK and the rising edge of K#_CLK. The data storage can accept a new command or data twice every clock period even though the command may take more than one K_CLK period to complete.

The data forwarded from the output port 116 is synchronized with the master clock pair. The skew compensation circuit 106 transmits the data forwarded from the output port 116 dependent on the delayed output clock 115. K_CLK and K#_CLK are delayed versions of K clock and K# clock received at input pins of the device. The C_CLK and C_CLK signals are delayed versions of the C clock and C# clock received at input pins of the device. The delay blocks 231, 232, 233, 234 refer to the delay due to input buffers, signal traces and other components in the device. The delayed output clock 115 is either a delayed version of the K# clock or a delayed version of the C# clock dependent on whether the clock detector 240 detects a clock signal on the data clock pair 114.

The clock detector 240 can be any clock detector known in the art. One embodiment of a clock detector is described later in conjunction with FIG. 4. The output 202 of the clock detector 240 controls multiplexers 200 and 220. The clock detector 240 detects if a clock signal is received on the data clock pair 114. The state of the C_Clock detect signal output by the clock detector 240 and coupled to multiplexers 220, 200 selects whether the K#_CLK or the C#_CLK is transmitted to the delayed output clock. If a clock signal 202 is detected on the data clock pair, the C#_CLK is forwarded as the delayed output clock through multiplexor 200 and to the input of delay locked loop (DLL) 210, and C_CLK is coupled to the input of delay locked loop (DLL) 230 through multiplexor 220. If a clock signal is not detected on the data clock pair, the K#_CLK and K_CLK are forwarded through multiplexors 200, 220.

As discussed previously, the skew compensation circuit 106 includes two transparent latches 120, 130. The output port 116 of the data storage 110 is coupled (A-data) to the 36-bit transparent latch 120. The data outputs (B-data) of transparent latch 120 are coupled to the data inputs of transparent latch 130. Transparent latch 120 is controlled by K#_CLK and transparent latch 130 controlled by delayed output clock 115. While K#_CLK is logic '1', transparent latch 120 is open and data is transferred from the data inputs (A-data bus) to the data outputs (B-data bus). While K#_CLK is logic '0', latch 120 is closed and data captured on the falling edge of K#_CLK is stored by the latch 120 and output on the B-data bus. While latch 120 is closed, changes on the input A-data bus do not result in changes in the output B-data bus. Transparent latch 130 operates in the same way in response to delayed output clock. With no skew between K#_CLK and delayed output clock, data on the A-bus is transmitted as it is received on the A-bus through both latches 120, 130 to the C-data bus. If there is skew between K#_CLK and the delayed output clock, data received on the A-bus is transmitted to latch 120 as it is received and stored by latch 120 to transmit valid data on the B data bus for transfer to the C-data bus while latch 130 is open. The operation of the transparent latches is described later in conjunction with FIGS. 4-8.

Delayed output clock 115 is not a DLL-locked signal and thus suffers from the well-known problem of insertion delay. An insertion delay is the time it takes a signal to travel from an input pin in an integrated circuit to where the signal is used in the integrated circuit. Insertion delay occurs due to resistive and capacitive delays of the physical wires and components of the system as well as the transition time through the input buffers.

The Delay Locked Loops (DLLs) 210, 230 are fine-tuned for a particular clock frequency range and compensate for the insertion delay. FIG. 3 illustrates the data clock pair (C clock, C# clock) as received at the input pins of the device 100. As shown in FIG. 3, the delayed output clock edges (falling and rising) occur an insertion delay 300 after the respective falling and rising edges of the data clock pair. The DLL compensates for the insertion delay by providing DLL output clocks (DLL_CK#, DLL_CK) without the insertion delay. The DLL outputs are therefore phase aligned with the data clock pair signals at the pins. The operation of the DLLs are described in more detail later in conjunction with FIG. 11.

Returning to FIG. 2, the outputs of the DLLs 230, 210 are coupled to an edge detector 190. The edge detector 190 can be any edge detector well-known to those skilled in the art. The edge detector outputs a positive pulse on the DDR clock signal 191 upon detecting a rising edge of the DLL_CK signal or the rising edge of the DLL_CK# signal. A rising edge on the DDR clock signal 191 clocks D-type flip flop 150 to produce the double data rate output. A set-reset flip flop 180 is also coupled to the edge detector 190. The state of the SR flip flop 180 changes with each rising edge of the edge detector output signal 192. The Set-Reset flip flop's output 193 is coupled to delay element 185. The output of delay element 185 is coupled to multiplexor 140 to select which 18 bits of the 36-bit data are output on each edge of the DLL output clocks 191. Data bits 35 to 18 are output in response to the rising edge of C_CLK and data bits 17 to 0 are output in response to the rising edge of C#_CLK.

Figure 4:
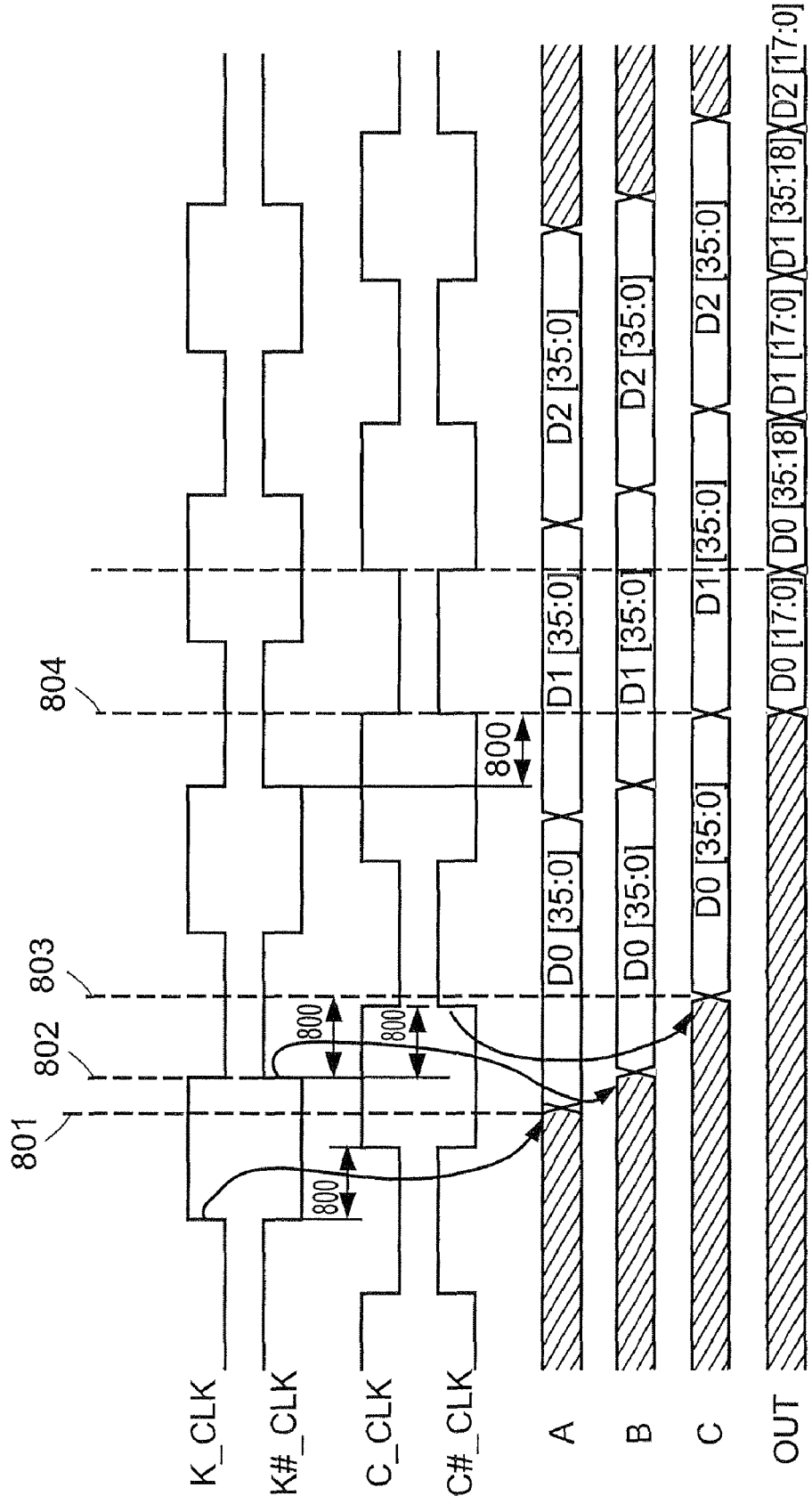
FIG. 4 is a timing diagram illustrating the relationship between the data and clocks in the skew compensation circuit shown in FIG. 2 for early data and moderate skew between the clocks.

FIG. 4 is a timing diagram illustrating the relationship between the data and clocks in the skew compensation circuit shown in FIG. 2 for early data and moderate skew between the master clock pair and the data clock pair. In the embodiment shown, a clock signal has been detected by the clock detector on the data clock pair and data out is synchronized to the rising edges of the data clock pair (C_CLK, C#_CLK). The C_CLK is a delayed version of the K_CLK and the C#_CLK is a delayed version of the K#_CLK. The timing diagram is described in conjunction with the block diagram in FIG. 2. There is a moderate skew 800 between the rising and falling edges of the respective delayed versions of the clocks and a data skew between valid data and the rising edge of the K_CLK.

At time 801, valid data from data storage is output early on port 116 on data bus A prior to the rising edge of the K#_CLK. The data received from data storage is valid for one K clock period. The valid data is shown as occurring in response to the first K_CLK rising edge but those skilled in the art will understand that it may take several K clock cycles to produce this output. At time 802, the rising edge of K#_CLK opens transparent latch 120 and data is transferred to data bus B. At time 803, the rising edge of C#_CLK opens transparent latch 130 and the valid data is transferred to data bus C. While K#_CLK is low the last data received on data bus A is stored in latch 120. Similarly when the C#_CLK is low the last data received on data bus B while C#_CLK is high is stored in latch 130.

Returning to FIG. 2, after the 36-bit data has been transferred to data bus C, it is transmitted 18-bits at a time through D-type flip flop 150 at a double data rate. The delayed multiplexor control signal 186 controls whether the lower or upper 18-bits are to be transmitted. At time 804, the next rising edge of C_CLK (and its DLL locked derivative signal DLL_CK#) latches data bits 35 to 18 at the input of D-type flip flop 170 on bus 133 onto bus 171. The resulting pulse on the edge detector output 191 clocks D-type flip flop 150 and data bits 17 to 0 are output through buffer 160. The pulse also switches the state of the Set Reset flip flop 180. The output of the Set Reset flip flop is delayed through the delay 185 and switches the state of the multiplexor enable to allow data bits 35 to 17 on bus 171 through the multiplexor to bus 141.

At time 805, the next rising edge of C_CLK (and its DLL locked derivative signal DLL_CK) also cause a pulse to be generated on signal 191 which clocks flip flop 150 to latch data bits 35 to 18. Data bits 35 to 18 are then output by buffer 160. A person skilled in the art will note that the system is designed so that setup and hold requirements of flip flops 170 and 150 are met. The skew compensation circuit conditions the data such that valid data is output on data bus C prior to the respective edge (rising or falling) of the output clock, so that valid data is synchronized with the output clock.

Figure 5:
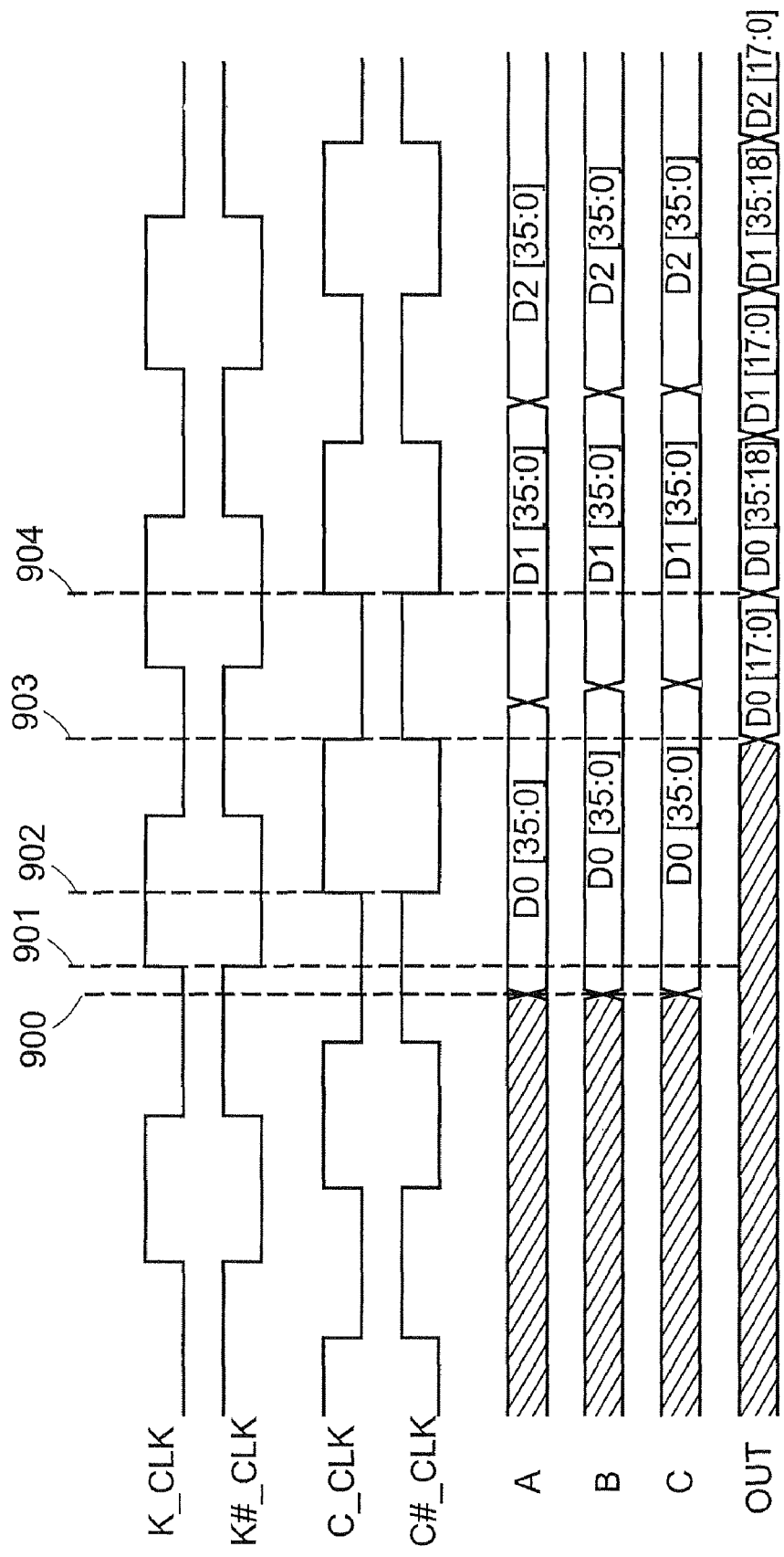
FIG. 5 is a timing diagram illustrating the relationship between the data and clocks in the skew compensation circuit shown in FIG. 2 for late data and moderate skew between the clocks.

FIG. 5 is a timing diagram illustrating the relationship between the data and clocks in the skew compensation circuit shown in FIG. 2 for late data and moderate skew between the master clock pair and the data clock pair. This data is valid on data bus A at time 900 after the rising edge of K_CLK. With K#_CLK high, latch 120 is transparent and the data is transferred from data bus A to B. Additionally, as C#_CLK is high, transparent latch 130 is open and the valid data is transferred from data bus B to C. Shortly thereafter, at time 901, K#_CLK transitions low and latch 120 stores the last data received on data bus A and transmits the stored data on data bus B. At time 902, C_CLK goes high and C#_CLK goes low transparent latch 130 stores the last data received on data bus B and transmits the stored data on data bus C.

At time 903, the rising edge of C#_CLK (and its DLL locked derivative signal DLL_CK#) through edge detector 190 latches the lower 18 bits (D[17:0]) of the 36-bit data bus in D-type flip flop 150 to transmit the lower 18 bits onto the output bus.

At time 904, the rising edge of C_CLK (and its DLL locked derivative signal DLL_CK) through edge detector 190 latches the upper 18 bits (D[35:18]) of the 36-bit data bus in flip flop 150 to transmit the upper 18 bits on the output bus.

Figure 6:
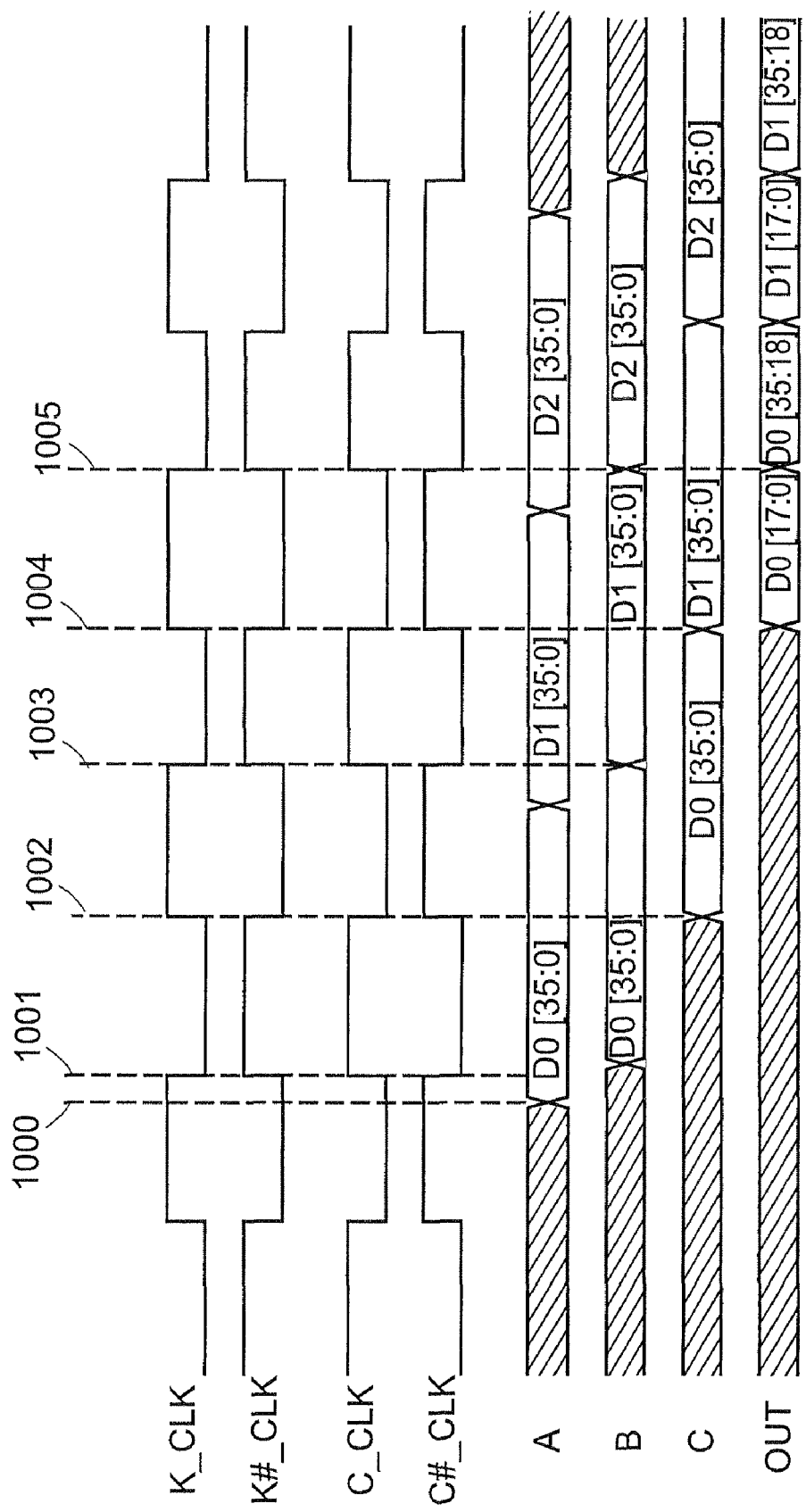
FIG. 6 is a timing diagram illustrating the relationship between the data and clocks in the skew compensation circuit shown in FIG. 2 for early data and worst case skew between the clocks.

FIG. 6 is a timing diagram illustrating the relationship between the data and clocks in the skew compensation circuit shown in FIG. 2 for early data and worst case skew (180 degrees) between the master clock pair and the data clock pair. This is the worst-case skew condition. At time 1000, the data is valid on data bus A. At time 1001, the rising edge of K#_CLK opens transparent latch 120 and valid data is transferred from data bus A to data bus B. At time 1001, the rising edge of C#_CLK (via signal delayed output clock) opens transparent latch 130 and the valid data is transferred form data bus B to data bus C. At the same time K#_CLK transitions low, which holds the data on data bus B in latch 120. At time 1003, the next falling edge of C#_CLK closes latch 130 and holds the data on data bus C.

At time 1004, the rising edge of C#_CLK (and its DLL locked derivative signal DLL_CK#) through edge detector 190 latches the lower 18 bits (D[17:0]) of the 36-bit data bus in D-type flip flop 150 to transmit the lower 18 bits onto the output bus.

At time 1005, the rising edge of C_CLK (and its DLL locked derivative signal DLL_CK) through edge detector 190 latches the upper 18 bits (D[35:18]) of the 36-bit data bus in D-type flip flop 150 to transmit the upper 18 bits on the output bus.

Figure 7:
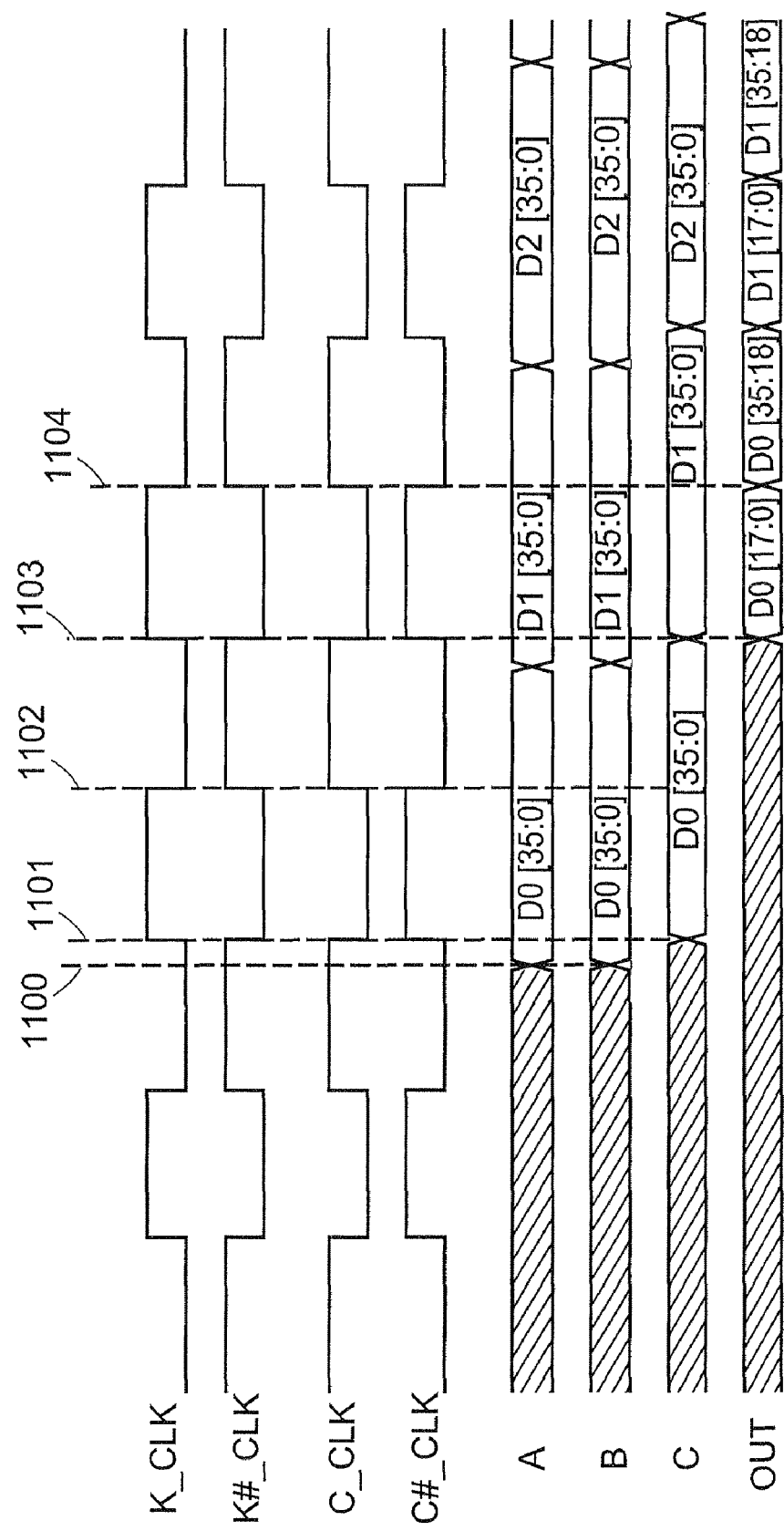
FIG. 7 is a timing diagram illustrating the relationship between the data and clocks in the skew compensation circuit shown in FIG. 2 for early data and worse case skew between the clocks.

FIG. 7 is a timing diagram illustrating the relationship between the data and clocks in the skew compensation circuit shown in FIG. 2 for late data and worse case skew between the master clock pair and the data clock pair. At time 1100, data is valid on data bus A at the input of latch 120. As latch 120 is open due to the logic '1' on the K#_CLK, the data on data bus A is transmitted through latch 120 onto data bus B.

At time 1101, the logic '0' on the K#_CLK closes latch 120 and the data on data bus A is stored in latch 120 and transmitted to data bus B. The logic '1' on the C#_CLK opens latch 130 and the data on data bus B is transmitted to data bus C.

At time 1102, the logic '0' on the C_CLK closes latch 130 and the data on data bus B is stored in latch 130 and transmitted on data bus C. The logic '1' on the K#_CLK opens latch 120 and the data on data bus A is transmitted to data bus B.

At time 1103, the rising edge of the C_CLK (and its DLL locked derivative signal DLL_CK#) through edge detector 190 latches the lower 18 bits (D[17:0]) of the 36-bit data bus in D-type flip flop 150 to transmit the lower 18 bits on the output bus.

At time 1104, the rising edge of C_CLK (and its DLL locked derivative signal DLL_CK) through edge detector 190 latches the upper 18 bits [D[35:18]) of the 36-bit data bus C in D-type flip flop 150 to transmit the upper 18-bits on the output bus.

Figure 8:
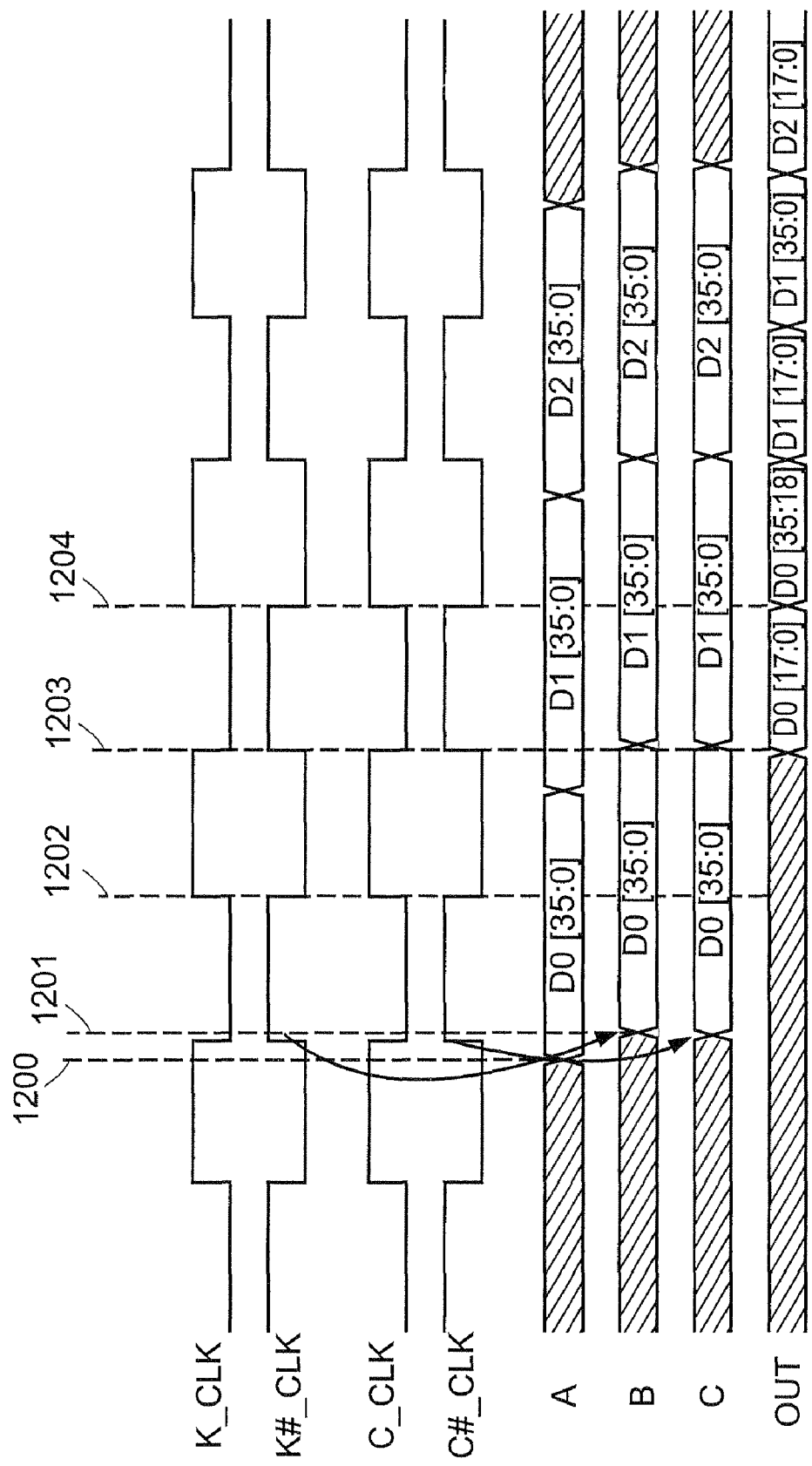
FIG. 8 is a timing diagram illustrating the relationship between the data and clocks in the skew compensation circuit shown in FIG. 2 for early data and no skew between the clocks.

FIG. 8 is a timing diagram illustrating the relationship between the data and clocks in the skew compensation circuit shown in FIG. 2 with early data and no skew between the master clock pair and the data clock pair. At time 1200, data is valid on data bus A at the input of latch 120. At time 1201, the logic '1' on the K#_CLK opens latch 120 and the data on data bus A is transmitted through latch 120 to data bus B. Also, at time 1201, the logic '1' on the C#_CLK opens latch 130 and the data on data bus B is transferred through latch 130 to data bus C.

At time 1202, the logic '0' on the K#_CLK closes latch 120, and the data on data bus A is stored in latch 120 and transmitted on data bus B. Also, the logic '0' on the C#_CLK closes latch 130, and the data on data bus A is stored in latch 130 and transmitted to data bus C.

At time 1203, the rising edge of C#_CLK (and its DLL locked derivative signal DLL_CK#) through edge detector 190 latches the lower 18 bits (D[17:0]) of the 36-bit data bus in D-type flip flop 150 to transmit the lower 18 bits onto the output bus.

At time 1204, the rising edge of C_CLK (and its DLL locked derivative signal DLL_CK) through edge detector 190 latches the upper 18 bits (D[35:18]) of the 36-bit data bus in D-type flip flop 150 transmit the upper 18 bits on the output bus. As discussed, both latches 120, 130 are open during the same time period (time 1201 to time 1202) and data is transferred through latch 120 and 130 as received from data bus A to data bus C while both the K#_CLK and the C#_CLK are high.

It can be seen that the invention permits a wide skew (0 degrees to 180 degrees) between the K and C clocks. The valid data arriving late or early with respect to the rising edge of the K#_CLK is transferred from one clock domain to the other clock domain over a wide skew between the clocks.

Figure 9:
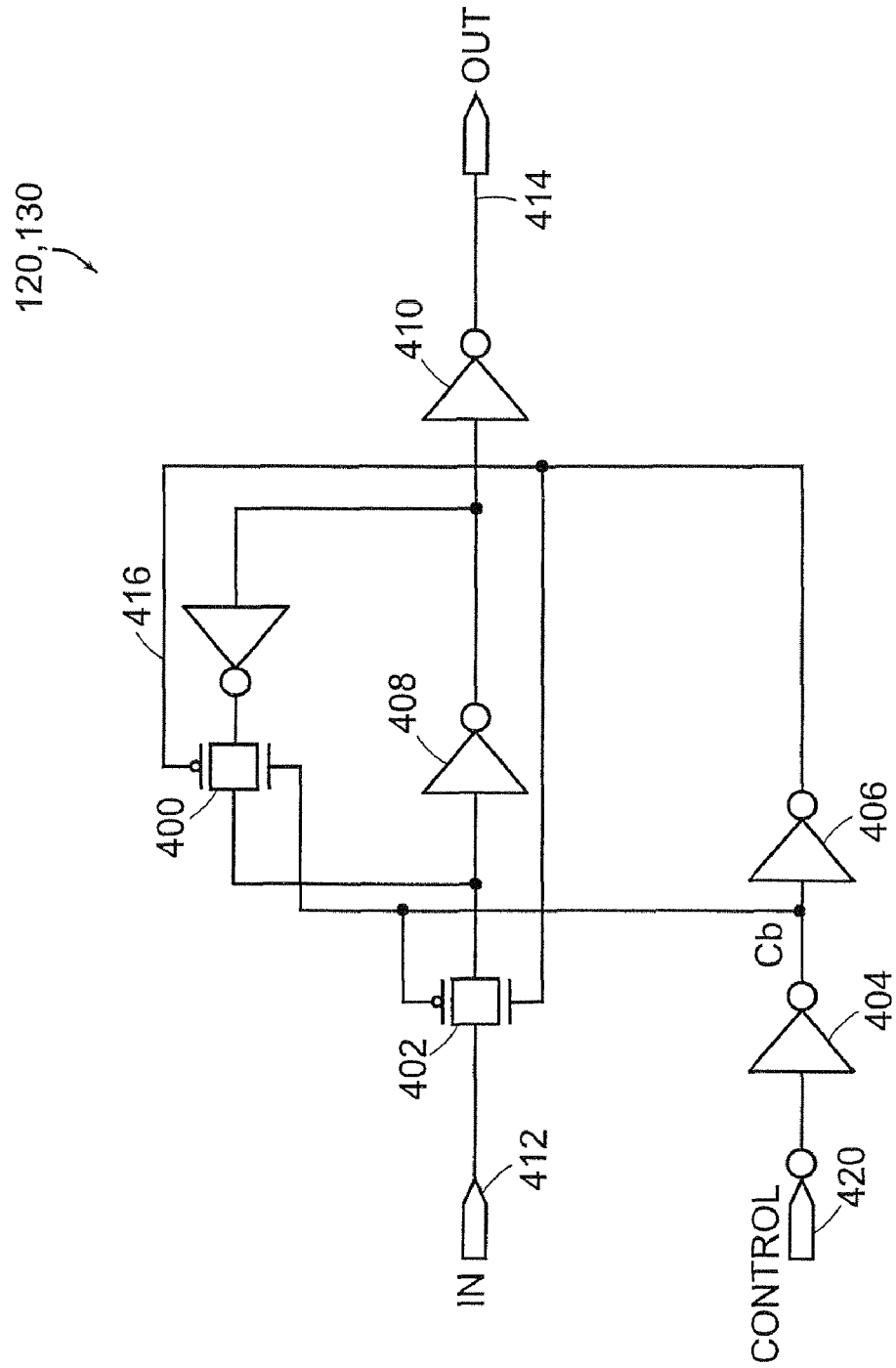
FIG. 9 is a schematic of an embodiment of any one of the transparent latches shown in FIG. 2.

FIG. 9 is a schematic of an embodiment of any one of the transparent latches 120, 130 shown in FIG. 2. While the control signal 420 is logic '1,' the latch 120, 130 is open and data received on the input 412 is transferred directly to the output 414. While the control signal is logic '0', the latch is closed and stored input data latched on the transition of the control signal from logic '1' to logic '0' is transferred to the output 414.

The transparent latch includes transmission gates 400, 402. As is well-known to those skilled in the art, a transmission gate includes a PMOS transistor and an NMOS transistor coupled such that both transistors are ON or OFF dependent on the state of a control signal coupled to the gates of the transistors. While both transistors are OFF, the latch is closed and data is not transmitted through the transmission gate. While both transistors are ON, the latch is open and data is transmitted through the transmission gate.

Only one of the transmission gates 400, 402 is open at one time. Transmission gate 402 is open while control signal is logic '1' and closed while control signal is logic '0'. Transmission gate 400 is open while control signal is logic '0' and closed while control signal is logic '1'.

While transmission gate 402 is open, transmission gate 400 is closed. Data received on the input port 412 is transmitted through transmission gate 402, and through inverters 408, 410 to the output port 414. Data transmitted through inverter 408 is also transmitted through inverter 416 to the input of transmission gate 400. While the control signal is logic '0,' transmission gate 402 is closed, data received on the input port 412 cannot be transmitted to the output port 414. Instead, because transmission gate 400 is open, the data present at the input of inverter 416 at the time the state of the control signal changes from logic '1' to logic '0' is transmitted through transmission gate 400, inverter 408 and 410 to the output port 414. Thus, the last data received through the input port while the control signal is logic '1' is stored (held) in the latch while the control signal is logic '0' and transmitted through the output port 414.

Figure 10:
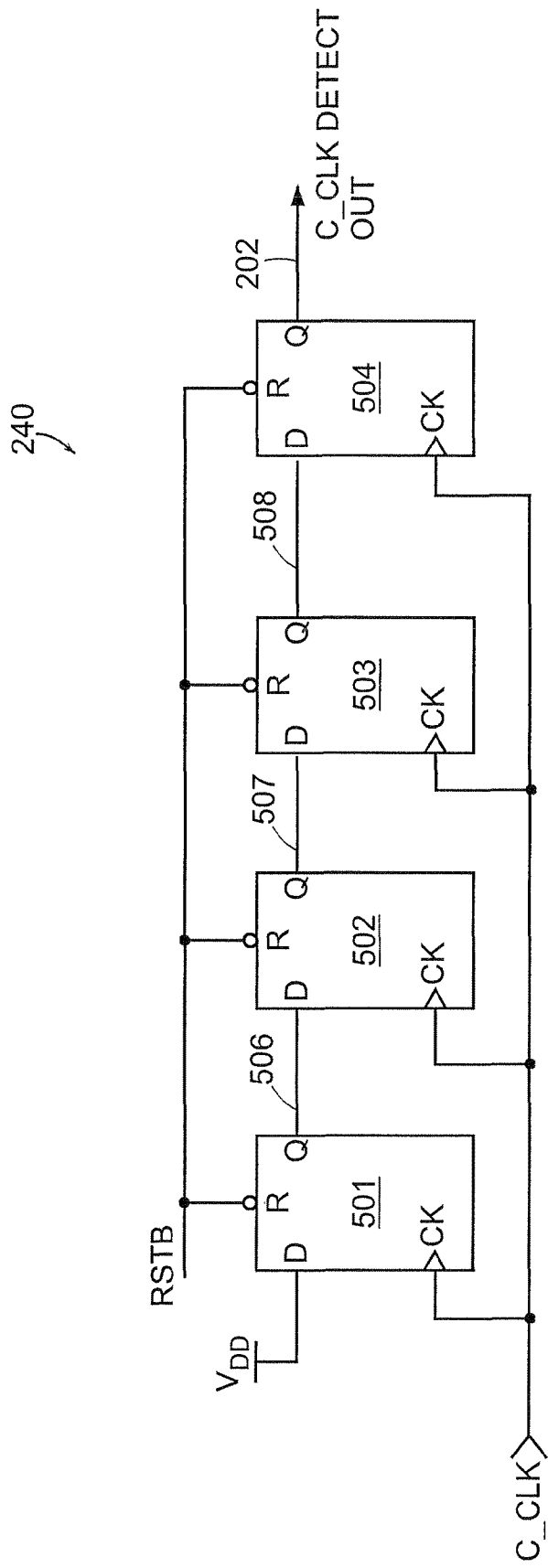
FIG. 10 is a schematic of the clock detector shown in FIG. 2.

FIG. 10 is a schematic of the clock detector 240 shown in FIG. 2. In the embodiment shown, the clock detector includes four D-type latches (flip flops) 501, 502, 503, 504 connected in series. The D-input of latch 501 is tied to $V_{DD}$ and the reset inputs of all the latches are connected to a reset signal RSTB. The clock detect output signal 202 is output from latch 504.

The reset signal RSTB set to logic '0' resets all of the latches 501, 502, 503, 504. After reset, the Q-outputs of each latch 501, 502, 503, 504 is set to logic '0,' including the Q-output of latch 504, the clock detect output signal 202.

The clock detector 240 detects whether there is a clock signal on the data clock pair. In the embodiment shown, the C_CLK signal is coupled to the clock inputs of the latches. However, the clock inputs of latches 501, 502, 503, 504 can be connected to either of the data clock pair signals, that is, to the C_CLK or the C#_CLK signal. The clock detector 240 indicates that it has detected a valid data clock after detecting four rising edges on the C_CLK.

Latch 501 detects the first rising edge of C_CLK. With the D-input connected to $V_{DD}$, a logic '1' is latched in 501 and the Q-output 506 of latch 501 changes from logic '0' to logic '1'. On the second rising edge of C_CLK, the logic '1' on the D-input of latch 502 is latched by latch 502 and the Q-output 507 of latch 502 changes from logic '0' to logic '1'.

On the third rising edge of C_CLK, the logic '1' on the D-input of latch 503 is latched by latch 503 and the Q-output 508 of latch 503 changes from logic '0' to logic '1'. On the fourth rising edge of C_CLK, the logic '1' on the D-input of latch 504 is latched by latch 504 and the Q-output 505 of latch 504 changes from logic '0' to logic '1'.

After detecting four rising edges on C_CLK, the clock detect output is set to logic '1' indicating that there is a clock signal on the data clock pair and all data output is to be synchronized with the data clock pair. The clock detect out signal remains set to logic '1' until a reset signal is detected.

Figure 11:
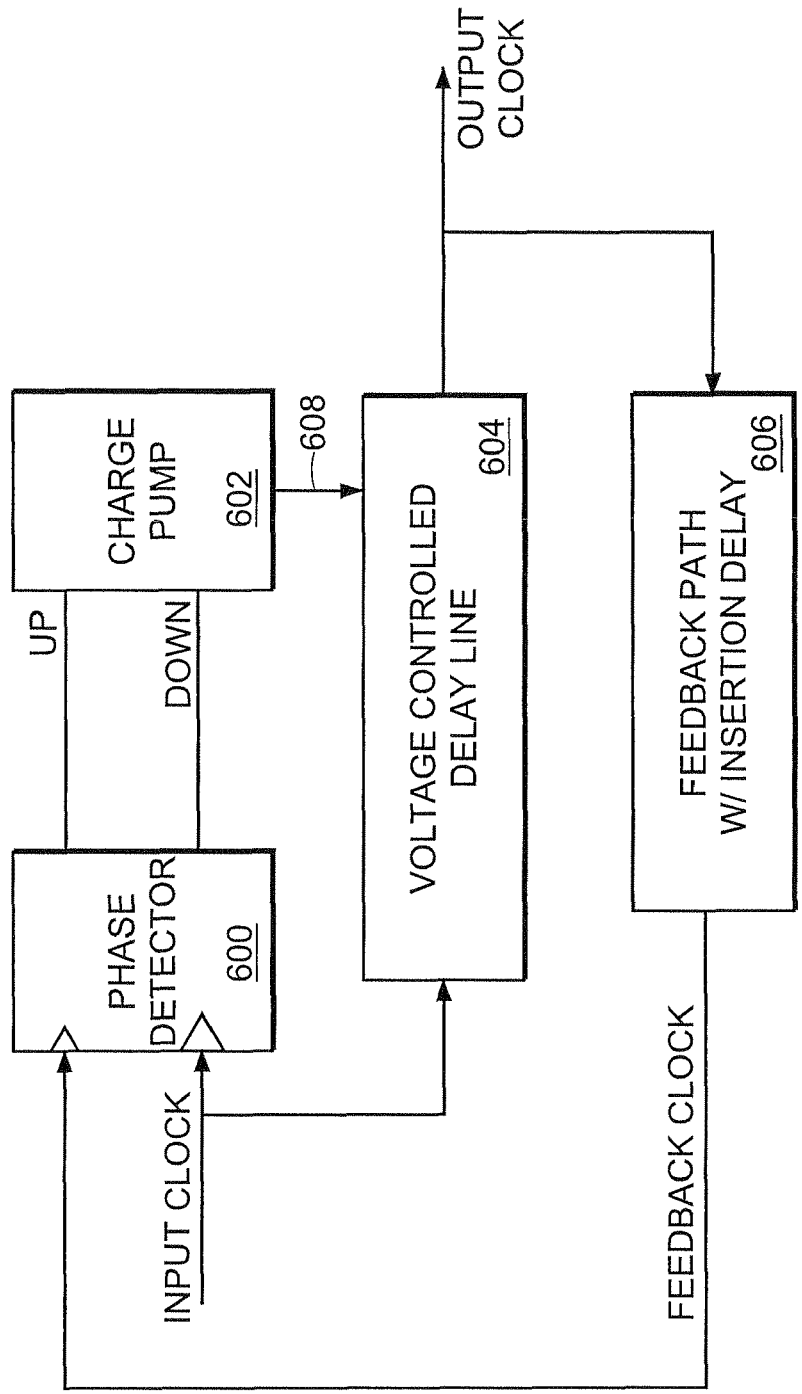
FIG. 11 is a block diagram of any one of the delay locked loops shown in FIG. 2.

FIG. 11 is a block diagram of any one of the delay lock loops 210, 230 shown in FIG. 2. The delay lock loop 210, 230 includes a phase detector 600, a charge pump 602, a voltage controlled delay line 604 and a feedback path with insertion delay 606.

The phase detector 600 detects the phase difference between the input clock and the output clock. While a phase difference is detected, the phase detector indicates the phase difference by driving the appropriate up/down signals at the output of the phase detector 600. The up/down signals are coupled to a charge pump 602. The charge pump 602 increases or decreases the control voltage 608 to a voltage controlled delay line appropriately to modify the delay added to the input clock to minimize the phase difference.

Delay is added to the input clock based on the detected phase difference between the input clock and the output clock. Delay is also added based on known insertion delay by the feedback path with insertion delay circuit 606.

The feedback path with insertion delay 606 includes replica delays to ensure that the DLL output clock is precisely locked to the selected clock pair (C, C# or K, K#) as shown in FIG. 3. The replica delay duplicates the components and paths that produce the insertion delay 231, 232, 233, 234 (FIG. 2) between the input pin (C, C# or K, K#) and where the clock signal (C_CLK, C#_CLK or K_CLK, K#_CLK) is used in the device. The replica delay is a group of circuits that are an exact replica of the insertion delay. For example, the replica delay includes the same components such as transistors with the same layout and configuration. Also, the same wiring widths and lengths are used in the replica delay.

As discussed in conjunction with FIG. 3, the input clock signal at the input to the DLL has insertion delay with respect to the clock signal received at the input pin of the device. The voltage controlled delay line 604 delays the input clock by almost a full clock period and generates an output clock. The output clock is coupled to the feedback path with insertion delay 606. The replica insertion delay delays the output clock. The phase detector 600 compares the input clock with the delayed output clock (feedback clock) and adjusts the charge pump 602. The DLL continues to adjust the voltage controlled delay line 604 until the feedback clock and the input clock are in phase. The output clock output from the DLL is the input clock minus the insertion delay. The DLL is stable when the input clock and the feedback clock are in phase. After adjusting for the phase difference and the insertion delay, the output clock is aligned to either the K# clock or the C# clock as received at the pin of the device.

Returning to FIG. 2, DLL 210 locks DLL_CK# to the K# clock or the C# clock. DLL 220 locks DLL_CK to the K clock or the C clock. Continuing with FIG. 11, the feedback path 606 in DLL 210 replicates the delay 232, 234 (FIG. 2) for the K#_CLK and the C#_CLK, and the feedback path in DLL 220 replicates the delay 231, 233 (FIG. 2) for the K_CLK and the C_CLK.

Figure 12:
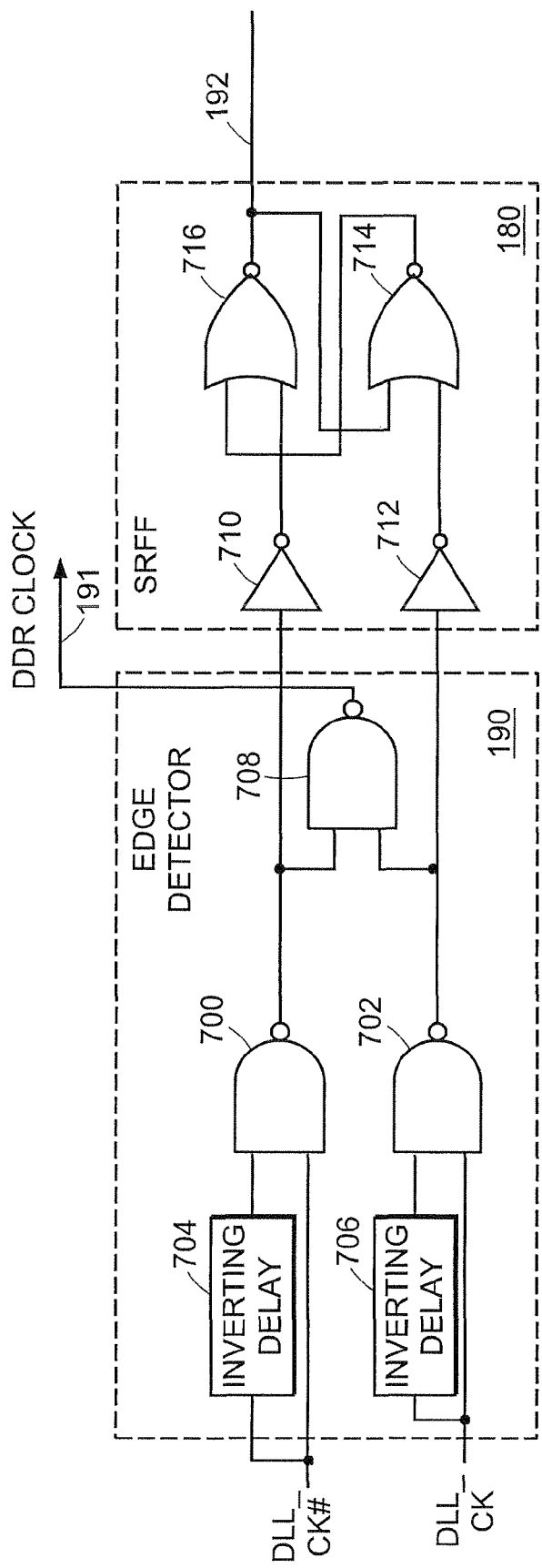
FIG. 12 is a schematic of an embodiment of the edge detector and the SR flip flop shown in FIG. 2.

FIG. 12 is a schematic of an embodiment of the edge detector 190 and the SR flip flop 180 shown in FIG. 2. The edge detector 190 generates a positive pulse on the DDR clock 191 in response to detecting a rising edge on either of the selected clock pair signals. In the embodiment shown, one of the clock pair signals (DLL_CK#) is coupled to an input of NAND-gate 700 and to an inverting delay circuit 704. The output of the delay circuit 704 is coupled to the other input of the NAND-gate 700. The other clock pair signal (DLL_CK) is coupled to an input of NAND-gate 702.

A rising edge on the DLL_CK input to NAND-gate 702 generates a negative pulse on the output of NAND-gate 702. The length of the pulse is dependent on the inverting delay 706. The negative pulse on the output of NAND-gate 702 generates a positive pulse on the DDR clock 191 and on the output of inverter 710. Similarly, a rising edge on the DLL_CK# input to NAND-gate 700 generates a positive pulse on the DDR clock 191.

The SR flip flop 180 is coupled to the outputs of NAND-gates 700, 702 in the edge detector 190 to set the state of the control signal to multiplexor 140 dependent on whether the first 18-bits or the second 18-bits of the 36-bit data bus are to be output on the DDR output. The operation of an SR flip flop is well known to those skilled in the art. A positive pulse on the output of inverter 710 in response to a rising edge of the DLL_CK# resets the output of the SR flip flop to a logic '0'. A positive pulse on the output of inverter 712 in response to a rising edge of the DLL_CK sets the output of the SR flip flop to logic '1'.

The above invention has been described for use in an embedded system. The invention also applies to a discrete component operating in a system with an input clock and an output clock.

While this invention has been particularly shown and described with references to preferred embodiments thereof, it will be understood by those skilled in the art that various changes in form and details may be made therein without departing from the scope of the invention encompassed by the appended claims.

What is claimed is:

1. A Double Data Rate (DDR) output latch comprising:
   a first edge triggered flip-flop for:
   receiving a first clock signal;
   receiving signals of a first part of a data bus; and
   providing the signals of the first part of the data bus synchronized to the first clock signal,
   a multiplexer for:
   receiving the synchronized signals of the first part of the data bus and signals of a second part of the data bus; and
   providing an output signal including either the synchronized signals of the first part of the data bus or the signals of the second part of the data bus depending on a multiplexor control signal,
   an edge detector for providing a second clock signal having a rate substantially double a rate of the first clock signal,
   a set-reset flip-flop for providing an output signal which changes state on both a rising and falling edge of the second clock signal,
   a delay element for:
   receiving the output signal from the set-reset flip-flop; and
   providing the multiplexor control signal, and
   a second edge triggered flip-flop for:
   receiving the output signal from the multiplexor;
   receiving the second clock signal; and
   providing a DDR output signal synchronized to the second clock signal.

2. The DDR output latch as claimed in claim 1 wherein the first clock signal comprises a clock pair.

3. The DDR output latch as claimed in claim 1 wherein a width of the first part of the data bus and a width of the second part of the data bus are substantially equal to half of a width of the data bus.

4. The DDR output latch as claimed in claim 1 wherein:
   signals of the data bus are provided by a transparent latch synchronized to a third clock signal; and
   the third clock signal is a delayed version of the first clock signal.

5. The DDR output latch as claimed in claim 4 further comprising:
   a delay locked loop (DLL) for receiving the third clock signal; and
   providing the first clock signal.

6. A method for providing a Double Data Rate (DDR) output signal comprising:
   receiving a first clock signal;
   receiving signals of a first part of a data bus;
   synchronizing the signals of the first part of the data bus to the first clock signal;
   selecting either the signals of the first part of the data bus or the signals of the second part of the data bus depending on a multiplexor control signal;
   providing a second clock signal having a rate substantially double a rate of the first clock signal;
   providing the multiplexor control signal which changes state a predetermined delay after both a rising and falling edge of the second clock signal; and
   synchronizing the selected one of the signals of the first part of the data bus or the signals of the second part of the data bus to the second clock signal and thereby providing a DDR output signal synchronized to the second clock signal.

* * * * *